United States Patent Office 3,428,134
Patented Feb. 18, 1969

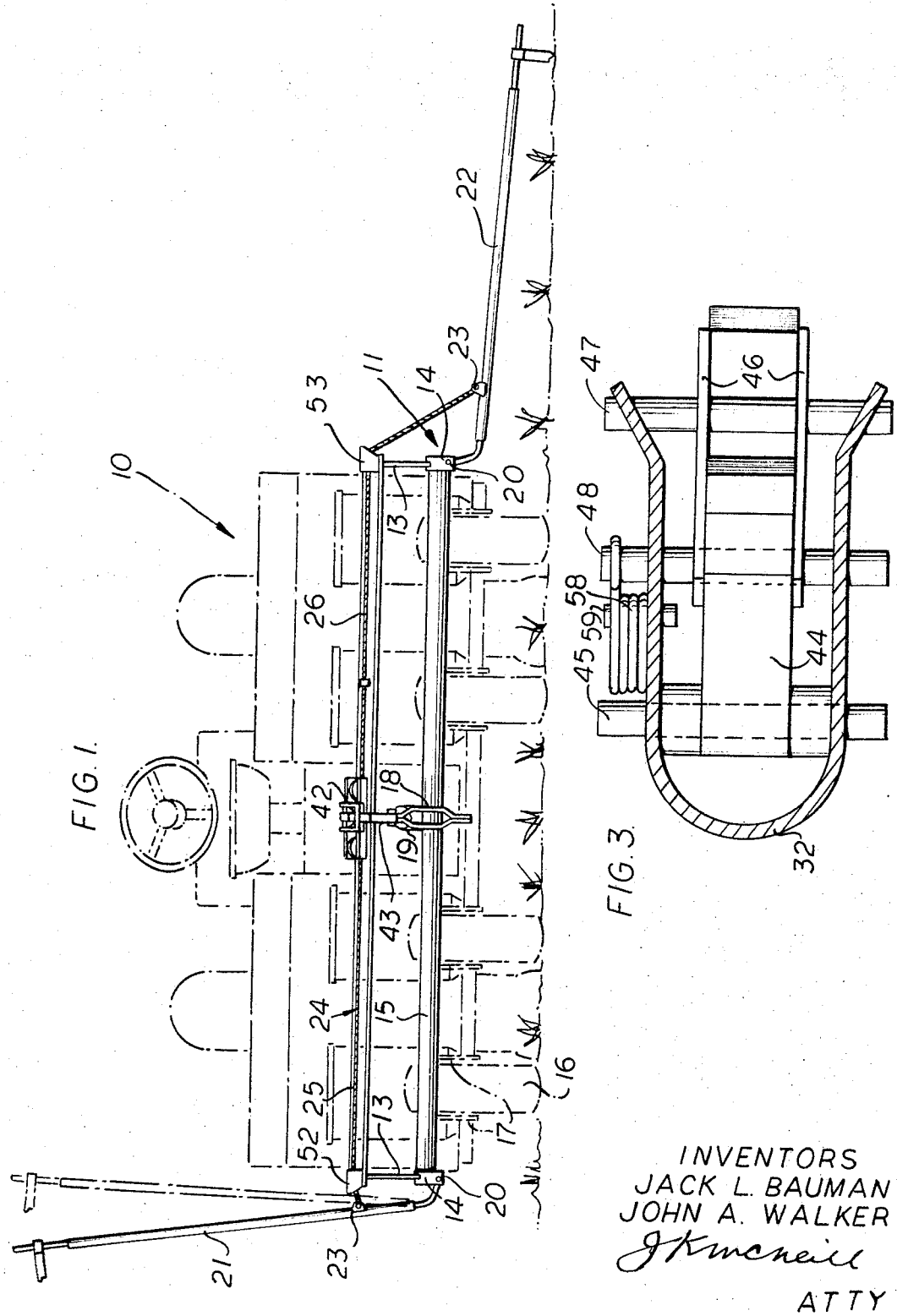

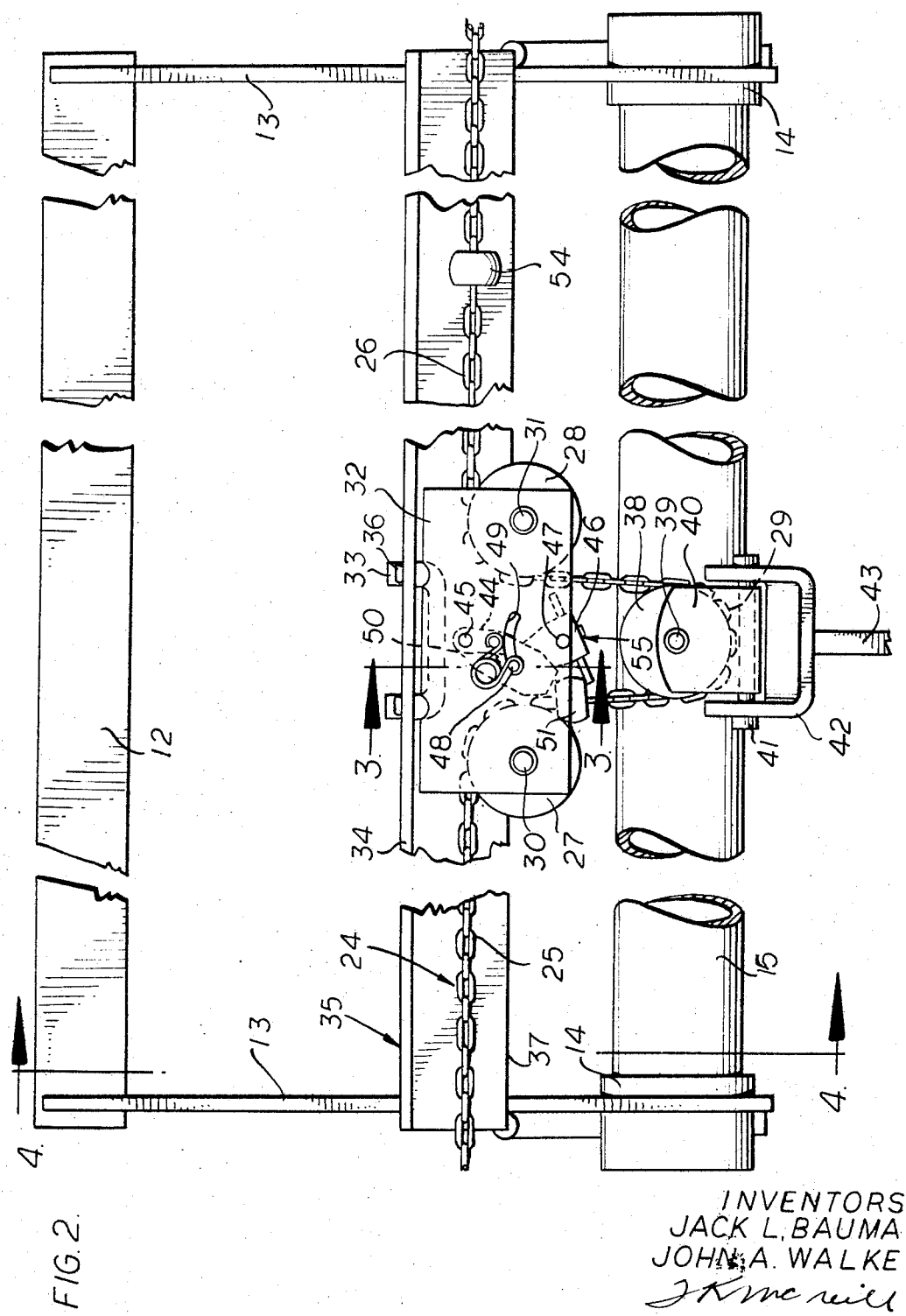

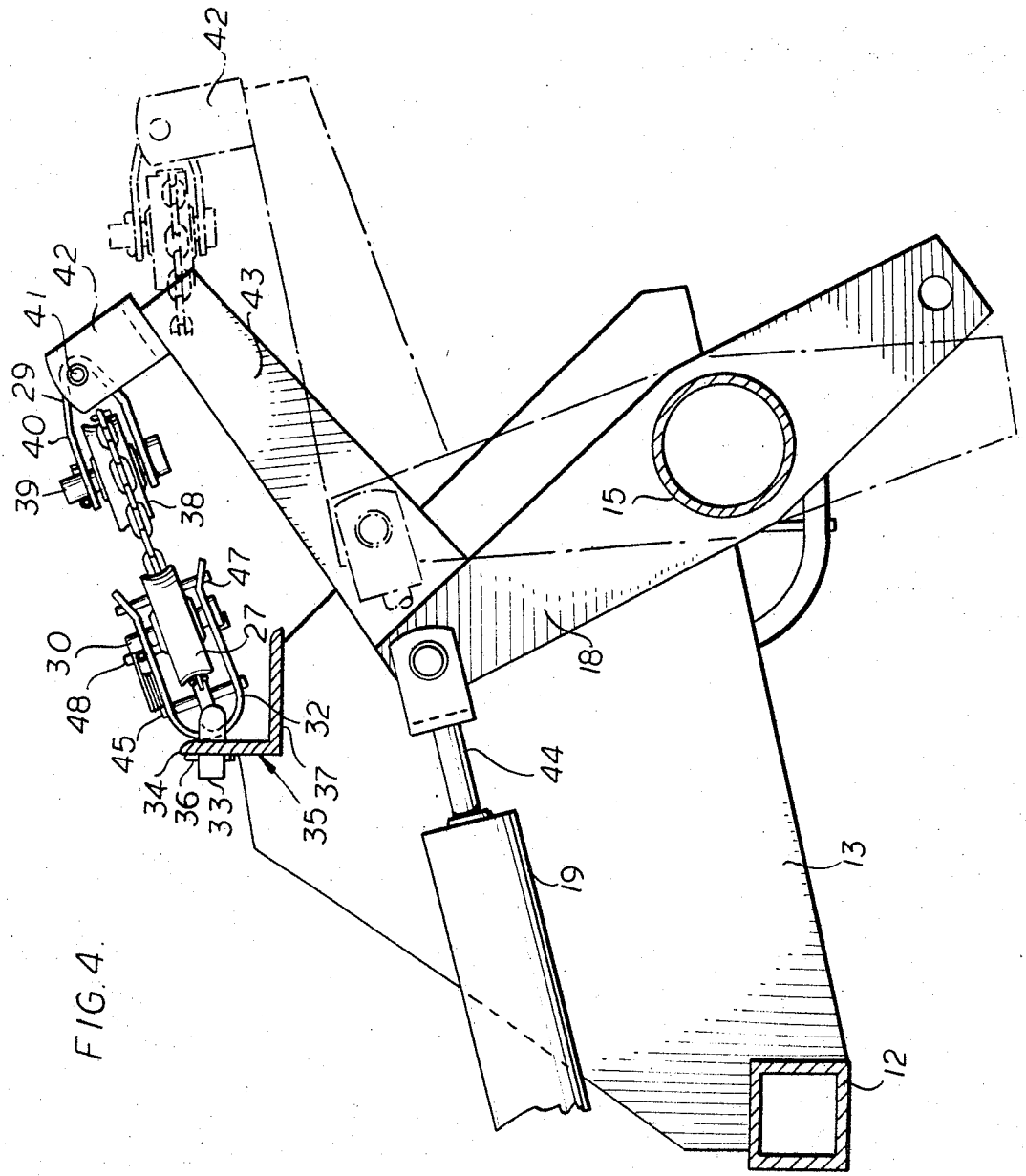

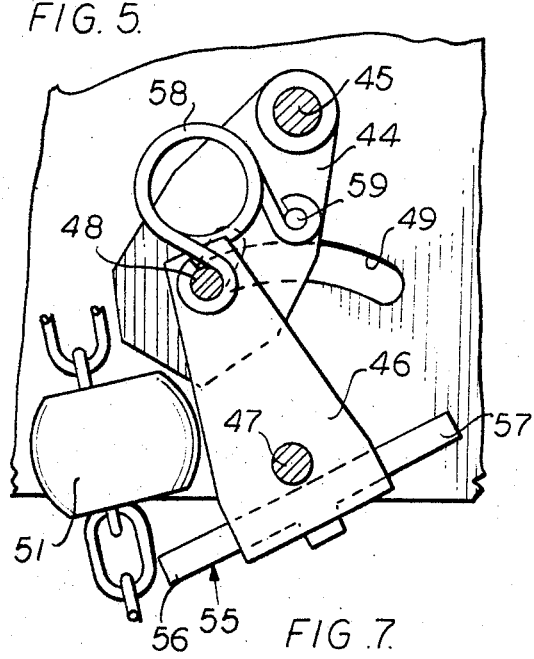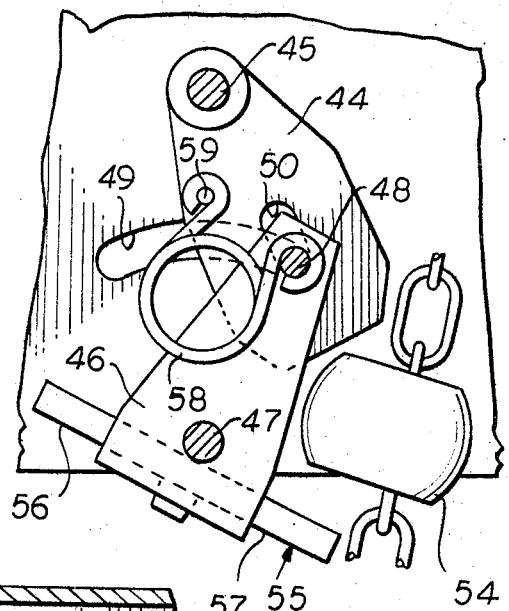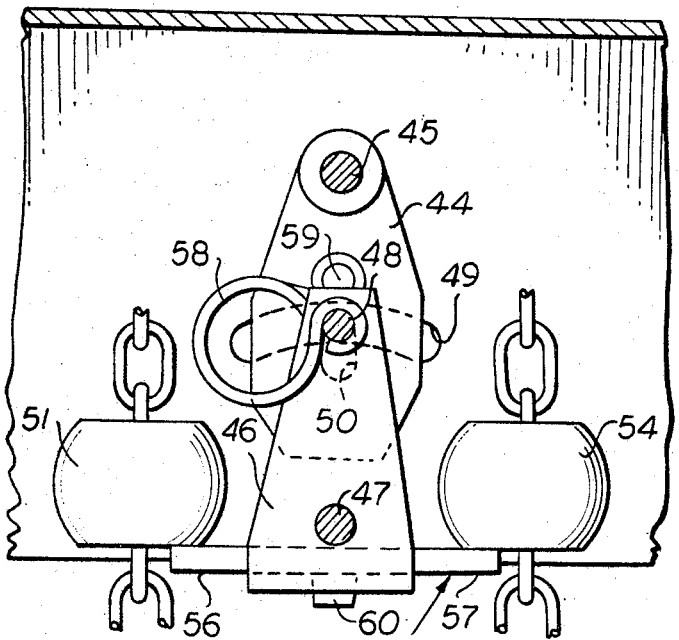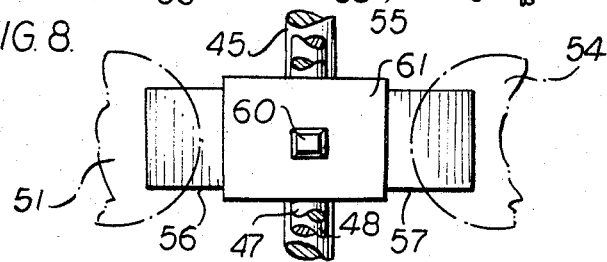

3,428,134
MARKER ALTERNATOR
Jack L. Bauman, Naperville, and John A. Walker, Downers Grove, Ill., assignors to International Harvester Company, Chicago, Ill., a corporation of Delaware
Filed Feb. 20, 1967, Ser. No. 617,341
U.S. Cl. 172—130                                          3 Claims
Int. Cl. A01b 39/28

ABSTRACT OF THE DISCLOSURE

A pair of markers mounted at the ends of an implement are alternately raised and lowered when raising and lowering the frame, by a chain connecting the markers having a central portion passing over spaced pulleys and reciprocated by the hydraulic lifting cylinder. Automatic alternation is achieved by an overcenter trip arrangement between the pulleys including an actuator alternately engaged by balls affixed to the chain sections leading to the markers and a latch swingable from one position to another to engage one of the balls and hold one marker in raised position.

---

This invention relates to agricultural implements, particularly planter markers, and an object of the invention is the provision of novel latch and alternator mechanism for a pair of markers.

Another object of the invention is the provision of novel operating mechanism for automatically and alternately raising and lowering the left and right-hand markers of a planter or the like, incident to the raising and lowering of the implement frame as when turning at the end of a field.

The present invention is described herein in its application to a multi-row planter such as that described in copending U.S. application Ser. No. 617,340, filed Feb. 20, 1967, and the latch and alternator mechanism herein described constitutes an improvement over that described in the above-mentioned application.

Other objects and advantages of the invention will become clear from the following detailed description when read in conjunction with the accompanying drawings wherein:

FIGURE 1 is a diagrammatic rear elevation of a planter connected to a tractor and having a wheel supported frame upon the ends of which markers are mounted and operated by mechanism incorporating the features of this invention;

FIGURE 2 is a plan view on an enlarged scale showing the marker operating aparatus of FIGURE 1 with the right-hand marker lowered for operation and the left-hand marker raised;

FIGURE 3 is a sectional elevation on an enlarged scale taken on the line 3—3 of FIGURE 2;

FIGURE 4 is a section taken on the line 4—4 of FIGURE 2;

FIGURE 5 is a sectional plan view of the structure of FIGURE 3 with the top plate of housing 32 removed showing the position of the marker latch and alternating mechanism with the left-hand marker raised and the right-hand marker lowered;

FIGURE 6 is a view similar to FIGURE 5 showing the opposite condition with the right-hand marker raised and the left-hand marker lowered.

FIGURE 7 is a view similar to FIGURES 5 and 6 showing a position of the parts which frequently occurs during operaiton; and FIGURE 8 is a rear elevation of the structure shown in FIGURE 7.

In FIGURE 1 is shown a tractor 10 to which is connected a 4-row planter having a frame 11 including a forward transversely extending structural member 12, square in cross-section, to which are secured generally triangularly shaped end plates 13 having bearings 14 rockably supporting the ends of a tubular shaft member 15. For the purpose of this invention it may be understood that wheels 16 are implement supporting wheels and are mounted on shaft 15 by arms 17.

It may also be understood that planter units, not shown, of any well-known type may be mounted upon frame 11 and are vertically moved with the frame between operating and transport positions by the provision of an arm 18 secured to tubular member 15 connected to a hydraulic cylinder 19 anchored at one end to the frame and supplied with fluid under pressure in a well known manner from the tractor 10. Rocking of shaft 15 by operation of cylinder 19 vertically swings wheels 16 to raise and lower the frame.

Bearings 14 at opposite ends of the planter frame are provided with pivot pins 20 upon which are mounted left and right-hand marker arms 21 and 22. Each of the markers 21 and 22 carries a lug 23 to each of which is anchored one end of transversely extending cable means in the form of a chain 24 having left and right-hand sections 25 and 26, respectively, trained over a pair of laterally spaced pulleys 27 and 28 and having a bight or central portion 29 extending rearwardly between pulleys 27 and 28.

Pulleys 27 and 28 are rotatably mounted on spindles 30 and 31 mounted in a U-shaped housing 32 having integral therewith pins 33 received in openings provided in the vertical flange 34 of a transversely extending angle bar 35 secured at its ends to plates 13. Pins 33 are retained in flange 34 by the provision of cotters 36. The horizontal portion 37 of angle bar 35 extends rearwardly below housing 32.

The central portion 29 of chain 24 is trained around a pulley 38 mounted on a spindle 39 carried by a clevis 40 pivotally mounted upon a pin 41 carried by a U-shaped member 42 secured to an extension 43 affixed to rock arm 18. Thus, extension of piston rod 44 in cylinder 19 rocks arm 18 and moves the bight portion 29 of chain 24 rearwardly, at the same time as the implement frame is lifted. This action shortens right-hand chain section 26 and raises marker arm 22 to an inoperative position corresponding to the raised position shown for left-hand marker 21.

In order, upon turning at the end of the field, for right-hand marker 22 to remain in its elevated position and left-hand marker 21 to be lowered to its operating position automatically, locking means is provided comprising a latch member 44 pivotally mounted upon a pin 45 carried by housing 32 and swingable laterally about the axis of pin 45.

A trip member 46 is mounted upon a pivot pin 47 carried by housing 32 and is pivotally connected by a pin 48 to latch member 44, pin 48 being slidably received in arcuately shaped slots 49 in housing 32. Trip member 46 includes spaced elements straddling latch member 44 and the opening in latch 44 receiving pin 48 is a slot 50 accommodating movement overcenter of the members 44 and 46, the ends of slot 49 limiting the extent of this movement.

In FIGURE 2 the movable part 43 has been shifted forwardly to the implement lowered position, and the right-hand marker 22 is in its lowered or operating position as shown in FIGURE 1. Left-hand marker 21 is in raised position and is held in that position by the provision of a ball-like stop member 51 secured to left-hand chain section 25. In FIGURE 2 stop member 51 is shown as having passed over pulley 27 and is prevented from returning about the pulley by its engagement with the free end of latch member 44, the stop member also abutting pulley 27.

In a normal cycle of operation, where the implement is to be turned at the end of a field, part 43 is moved rearwardly carrying with it pulley 38 and bight portion 29 of the chain. Left-hand marker 21 moves to the dotted line position of FIGURE 1, engaging a chain guide 52 mounted on angle bar 35 at the left-hand end thereof, a similar chain guide 53 being provided at the other end of the frame. Thus, rearward movement of part 43 feeds right-hand chain section 26 rearwardly and a stop member 54 secured to right-hand chain section 26 travels over pulley 28.

In order to trip the overcenter operating elements 44 and 46 from the left to right-hand overcenter position an actuating member 55 is secured between the spaced elements of trip member 46 and has left and right-hand portions 56 and 57, respectively, projecting laterally from opposite sides thereof. As stop member 54 passes around pulley 28 portion 57 of actuator 55 acts as an abutment engaging the stop member, and as part 43 continues movement rearwardly stop 54 swings trip member 46 clockwise about pivot 47, moving pin 48 in slot 49 and shifting latch member 44 overcenter to the right-hand position as shown in FIGURE 6.

Upon movement of latch member 44 overcenter to the right, stop member 51, upon forward movement of part 43 to lower the frame, can now pass around pulley 27 and allow left-hand marker 21 to be lowered while marker 22 is raised to its non-operating position, right-hand stop member 54 moving into engagement with latch 44 and pulley 28, this position of the parts being shown in FIGURE 6.

The operating members 44 and 46 are biased to their overcenter positions by the provision of a torsion spring 58 anchored at one end to pin 48 and at its other end to a pin 59 carried by housing 32.

Actuating member 55 is a unitary bar of inherently flexible material, preferably plastic, secured between the elements of trip member 46 and having a nub 60 projecting through an opening in an end plate 61 connecting the spaced elements of trip member 46. Although being flexible so that projecting portions 56 and 57 may be bent in both directions, actuator 55 is sufficiently resistant when engaged by stops 51 or 54 to trip latch member 44 overcenter by rocking trip member 46 about its axis 47, and it is sufficiently flexible under abnormal conditions, hereinafter referred to, to allow either or both of the stop members 51 and 54 to pass without causing damage to the implement parts.

A condition such as shown in FIGURES 7 and 8 with both of the stops 51 and 54 within the housing 32 engaging actuator 55 simultaneously and with the elements 44 and 46 on center occurs when the implement and operating marker are lifted, for example, when traveling over bumpy terrain. Under normal circumstances, when part 43 and pulley 38 are moved rearwardly from the position shown in FIGURE 2, left-hand marker 21 moves from the solid line to the dotted line position of FIGURE 1, ball 51 moving rearwardly past left-hand portion 56 of actuator 55. Right-hand marker 22 is lifted and ball 54 moves into engagement with right-hand actuator portion 57 to trip latch 44 and lock right-hand marker 22 in raised position. Upon lowering the implement frame ball 51 moves past left-hand actuator portion 56 and over pulley 27 to allow the left-hand marker 21 to be lowered with the implement frame. However, when traveling over bumpy ground, for example, raised marker 21 wobbles about its pivot 20 placing left-hand chain section 24 in tension so that ball 51 does not move past actuator 55, and upon engagement of ball 54 with the actuator, latch 44 and trip 46 line up in the on-center position shown in FIGURE 7. When this occurs, further operation of the cylinder 19 and rearward movement of part 43 causes balls 51 and 54 to bend the ends 56 and 57 of actuator 55 rearwardly to release the balls or stops, allowing member 44 and 46 to trip to an overcenter position. Lowering of the implement frame then allows one of the ball stop members to engage latch 44 and the other to pass over its associated pulley, permitting the marker to drop.

It is believed that the construction and operation of the novel marker alternator mechanism of this invention will be clearly understood from the foregoing description. It should likewise be understood that the invention has been described in a preferred embodiment and that modifications may be made therein without departing from the spirit of the invention.

What is claimed is:

1. In an implement having a frame, a pair of markers mounted on the frame connected by a chain and a part mounted on the frame for reciprocating movement and connected to the central portion of the chain for movement in a direction normal to the plane thereof, the combination of latch and alternator mechanism for alternately locking one marker in raised position while lowering the other comprising, left and right-hand pulleys mounted on the frame over which the central portion of said chain is trained to form left and right-hand chain sections, left and right-hand stop members secured to the respective of said chain sections and movable over said pulleys upon reciprocation of said part, and overcenter locking means mounted on the frame between said pulleys including a latch member and a trip member pivotally mounted on the frame and having a pivoted connection to each other, said pivoted connection being movable overcenter in opposite directions to alternately engage one of said stop members to hold the associated marker in raised position while accommodating lowering of the other, and actuator means mounted on said trip member comprising left and right bar means rigidly secured to and extending from opposite sides of said trip member and alternately engageable by the respective of said stop members to swing said trip and latch members overcenter, said bar means being sufficiently rigid to trip said members under normal operating conditions and sufficiently flexible to accommodate deflection thereof in both directions under abnormal operating conditions upon engagement thereof by said stop members.

2. The invention set forth in claim 1, wherein said bar means is made of inherently flexible material.

3. The invention set forth in claim 2, wherein said bar means is made of plastic.

References Cited

UNITED STATES PATENTS 2,604,027   7/1952   Hansen _____ 172—128
2,975,841   3/1961   Oehler et al. _____ 172—128

ABRAHAM G. STONE, *Primary Examiner.*

JAMES W. PETERSON, *Assistant Examiner.*

U.S. Cl. X.R.

172—128